US005558557A

United States Patent [19]

Dashevsky

[11] Patent Number: 5,558,557
[45] Date of Patent: Sep. 24, 1996

[54] THREE AXIS CONTROL FOR MACHINE TOOL

[75] Inventor: Leon G. Dashevsky, Plymouth, Minn.

[73] Assignee: Innovex Inc., Hopkins, Minn.

[21] Appl. No.: 354,540

[22] Filed: Dec. 13, 1994

[51] Int. Cl.[6] ................................................. B24B 49/10
[52] U.S. Cl. ................................ 451/10; 451/5; 451/26
[58] Field of Search .................................. 451/21, 9, 10, 451/5, 8, 414, 405, 387, 26

[56] References Cited

U.S. PATENT DOCUMENTS

| 3,736,818 | 6/1973 | Ennis | 451/26 |
| 4,602,459 | 7/1986 | Drits et al. | 451/11 |

*Primary Examiner*—Robert A. Rose
*Attorney, Agent, or Firm*—Westman, Champlin & Kelly, P.A.

[57] ABSTRACT

A three axis control for a machine tool which maintains a plane surface being ground or machined by a tool at a desired orientation. A base supports an intermediate plate on flexures, and the position of the intermediate plate in a plane parallel to the base is controlled by a pair of actuators that are spaced apart along a line that is parallel to the direction of movement of the intermediate plate and a workpiece past the tool. Sensors move along a planar reference surface as the intermediate plate moves and sense deviations of the intermediate plate from a straight line and control the actuators to maintain the intermediate plate in its desired path through closed loop control. The workpiece to be worked on is preferably mounted on a tooling plate that in turn is mounted on the intermediate plate about an axis parallel to the line of movement. The position of the tooling plate about the axis is sensed by a third sensor operating on the reference surface to control an actuator that in turn controls position of the tooling plate about the axis. The sensors and controlled actuators insure that the surface of the workpiece will be planar, that is, straight and flat.

17 Claims, 7 Drawing Sheets

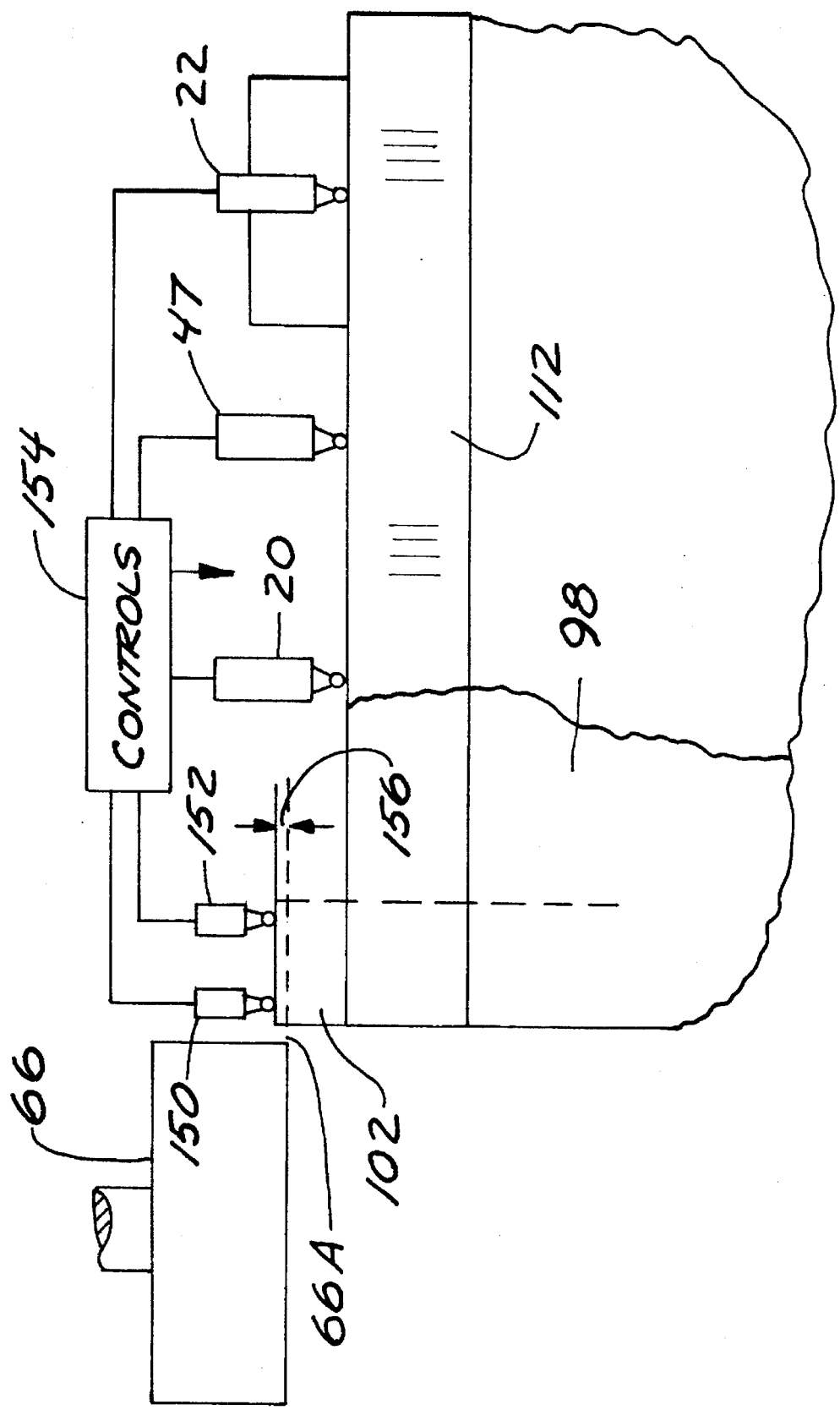

THREE AXIS CONTROL FOR MACHINE TOOL

BACKGROUND OF THE INVENTION

The present invention relates to controlling the positioning of a workpiece on a machine tool or similar device on three axes, so that a planar and straight surface can be machined onto a workpiece, or the ultimate straight motion can be applied to the workpiece for a measurement or adjustment purpose.

U.S. Pat. No. 4,602,459 issued Jul. 29, 1986 discloses a control system for precision machine tools and similar devices that utilizes a workpiece support having a flexible hinge connection from a base to a support block. The position of the support block is controlled by an actuator moving in response to a sensor that senses deviations of a straight line of a reference surface carried on the support from its initial position.

The device of U.S. Pat. No. 4,602,459 maintains a straight line, in most instances, but it can have deviations from a straight line since only one sensor is utilized. If the workpiece happens to pivot about the contact point between the sensor and the reference surface, a curved surface can be ground or machined on the workpiece, while the sensor is not indicating any deviation of the reference surface from its initial position.

The device of the present invention eliminates deviation from straight line motion and provides a straight, planar machined surface by including a pair of sensors moving along a straight and flat reference surface that maintain the piece part in a straight axis as it moves relative to a machine tool, and a third sensor which provides a signal indicating deviations of the reference surface and the piece part from its positioning along a third axis.

SUMMARY OF THE INVENTION

The present invention provides sensors and controls for maintaining a desired straight line on a part being machined, and by adding a third sensor maintaining the straight line in a straight plane without any curvature in the three axes of positioning of a surface.

As disclosed, utilizing two sensors that have sensing points that are spaced from each other along a reference surface will maintain that reference surface in a straight path along a length axis. This provides a first step in correcting the possibility of grinding a curve on a surface of a piece part. Further definition and control is provided by supplying a third sensor which controls pivoting or tilting of the plane about the axis defined by the line control of the first two sensors. The use of three sensors insures a flat, straight plane being ground or machined on a part without unwanted deviations. The existing depth of cut and other positioning parameters of a machine tool can be utilized with normal open loop controls.

In the present device, the support for the piece part is mounted relative to a base utilizing an intermediate block that is supported on the base on flexures which permit horizontal movement of an intermediate block parallel to the base, with or without rotation around a vertical axis, that is, the axis perpendicular to the base to provide for control of the workpiece support through use of two actuators that respond to signals from the sensors establishing a straight line along a reference surface which will maintain a straight line of grind as the reference surface slides along the sensors. These two actuators are short stroke, rigid actuators that are mounted on the same base as the intermediate support block, so that they will move the intermediate block short distances parallel to the base with or without rotation around a vertical axis to compensate for any tendency of the reference surface to deviate from its initial position. The intermediate support is compliant in the plane of compensation (horizontal), but is rigid in a direction perpendicular to the plane of compensation (vertical). The intermediate plate can be shifted in its plane, or twisted about an axis perpendicular to its plane.

The actual positioning of the part along the axis of the machine tool can be controlled by normal machine tool table actuators or feeding mechanisms that are accurate enough to get the required positioning.

In parts that have some substantial height, that is a width or transverse dimension that forms a plane parallel to the straight line established by the two sensors, the third sensor is added at a position spaced along an axis perpendicular to the line connecting the first two sensors and generally centered between the first two sensors. The workpiece itself is supported on a tooling plate that is mounted to the intermediate plate and spaced above the intermediate plate with a flexure hinge arrangement that provides a hinge axis parallel to the straight line established by the first two sensors. The position of the tooling plate about this hinge axis is controlled by a third precise, closed loop actuator so that once the part is engaged by the machine tool and all three sensors are moving along a flat previously formed reference surface, the machine tool, such as a grinding wheel, will provide a straight, flat, and properly oriented surface on the workpiece.

Initially, the workpiece can be put into position so that a desired amount of material is removed, and subsequent parts then can be placed in the fixture in a repeating manner, as in any normal machine tool. Table closed loop control will move the workpiece to its initial zero position relative to the grinding wheel (which is the tool disclosed) and will move the workpiece past the grinding wheel in direction parallel to the straight plane established by the group of three sensors.

The present invention permits grinding with ultra precision. The initial setup of the machine with the closed loop control, following verification of zero for the workpiece positioning sensors with a ground workpiece as described below, and grinding each workpiece in a closed loop control between three sensors sliding along reference surface and piezo actuators that control positioning of the workpiece for straightness and flatness produce extremely straight, flat ground surfaces with a high surface finish, and positioned precise distances from selected features on the workpiece.

The use of three sensors that establish the straight and flat plane of the machined surface cancels most of the initial errors of the machine tool slides, and permits compensating for unavoidable deterioration of the slides due to wear, once the flatness and straightness of the reference surface is maintained. This allows one to greatly reduce the cost of maintenance of the machine over the years of production.

While direct contact sensors are shown sliding against a previously formed reference surface, non-contact sensors also can be used, such as capacitive sensors. Such non-contact sensors are more sensitive to the environment in which they are used and generally less precise. Laser based non-contact sensing systems can be used, but the moisture and a changing reflectivity of the reference surface in a coolant environment may be a serious technical problem on top of much higher cost of installation and maintenance of such systems.

In short, the present invention unit provides a readily available and economical device for maintaining very precise grinding features of surfaces that are to be machined.

BRIEF DESCRIPTION OF THE DRAWINGS

FIG. 8 is a schematic top plan view of the device of the present invention illustrating workpiece position sensors.

DETAILED DESCRIPTION OF THE PREFERRED EMBODIMENTS

Figure 1:
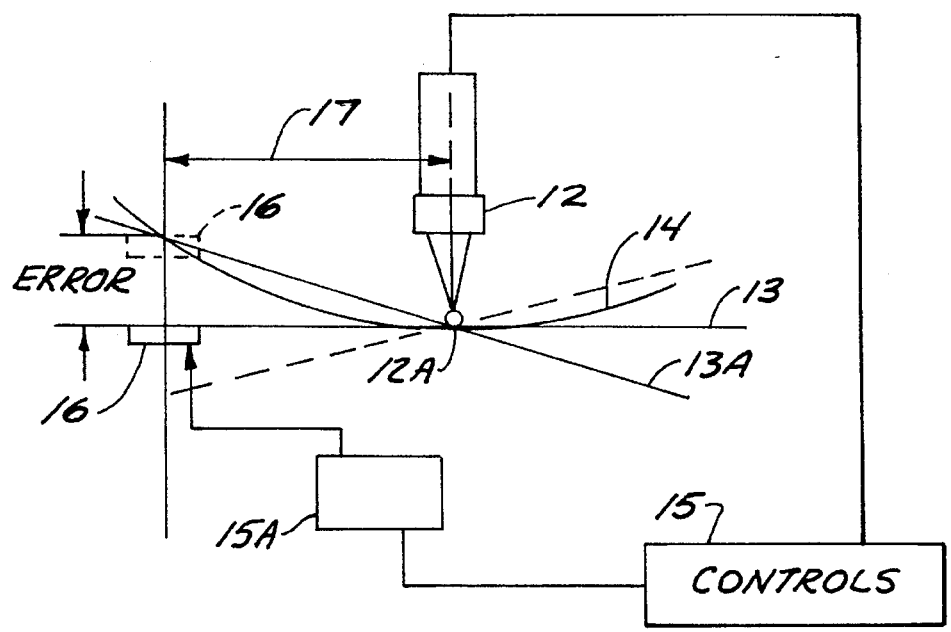
FIG. 1 is a schematic representation of a part being ground utilizing the prior art configuration of U.S. Pat. No. 4,602,459.

Referring to FIG. 1, in the schematic representation of the prior art, it should be noted that when a single sensor such as that shown at 12 is utilized for running against a reference surface 13, and if the reference surface tilts at an angle centered on the sensor, as shown at 13A, the sensor end 12A does not notice any difference and if the sensor is moved along a reference surface that is curved as shown at 14, the controls 15 and actuator 15A which are to adjust the position of the workpiece 16 will not change. When the workpiece and the tool are positioned at a distance from the sensor, as shown by the double arrow 17, a curved surface is generated on the piece part that corresponds in shape to curved line 14. In single axis control, curving of the piece part surface can occur.

Figure 2:
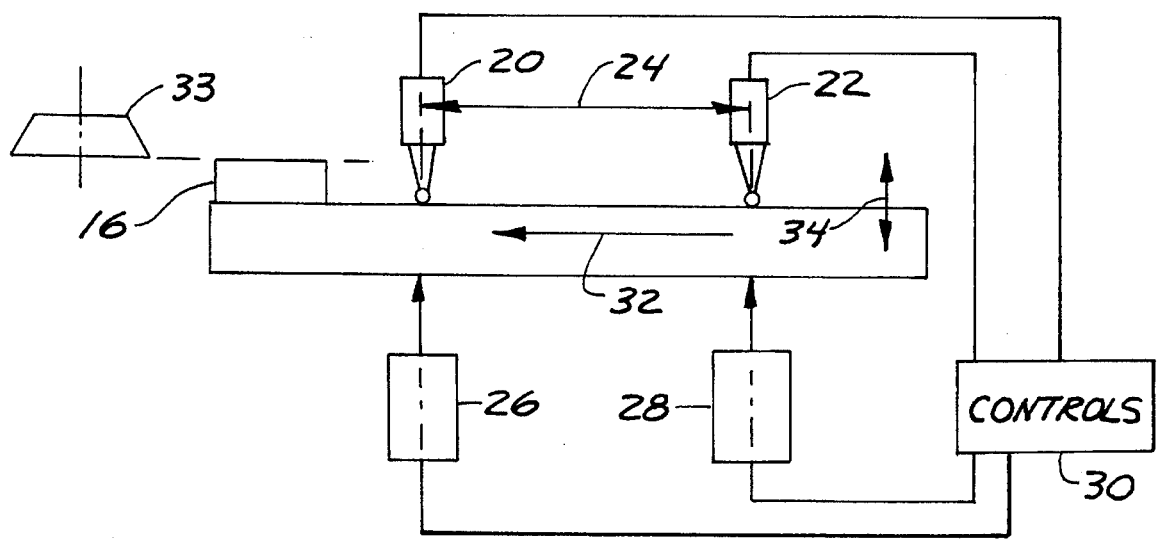
FIG. 2 is a schematic representation of a first step utilizing the present invention to establish a straight line by the use of two sensors arranged in such line.

Schematically shown in FIG. 2, is a portion of the structure of the present invention, that shows a planar reference surface that is sensed at two points with sensors 20 and 22. The sensors are spaced apart by a length indicated at 24. The position of the planar surface and of the workpiece 16 is controlled by first and second actuators 26 and 28, operating under closed loop control 30 from respective inputs from the sensors. The workpiece will be maintained in a straight line as it and the planar surface move in direction as indicated by the arrow 32. Any tendency for the reference surface and workpiece to drift in directions as indicated by the arrow 34 will be sensed by one of the sensors 20 or 22, or by both, and the position of the reference surface and workpiece will be maintained in a straight line as it moves across the grinding wheel 33 or other tool.

Figure 3:
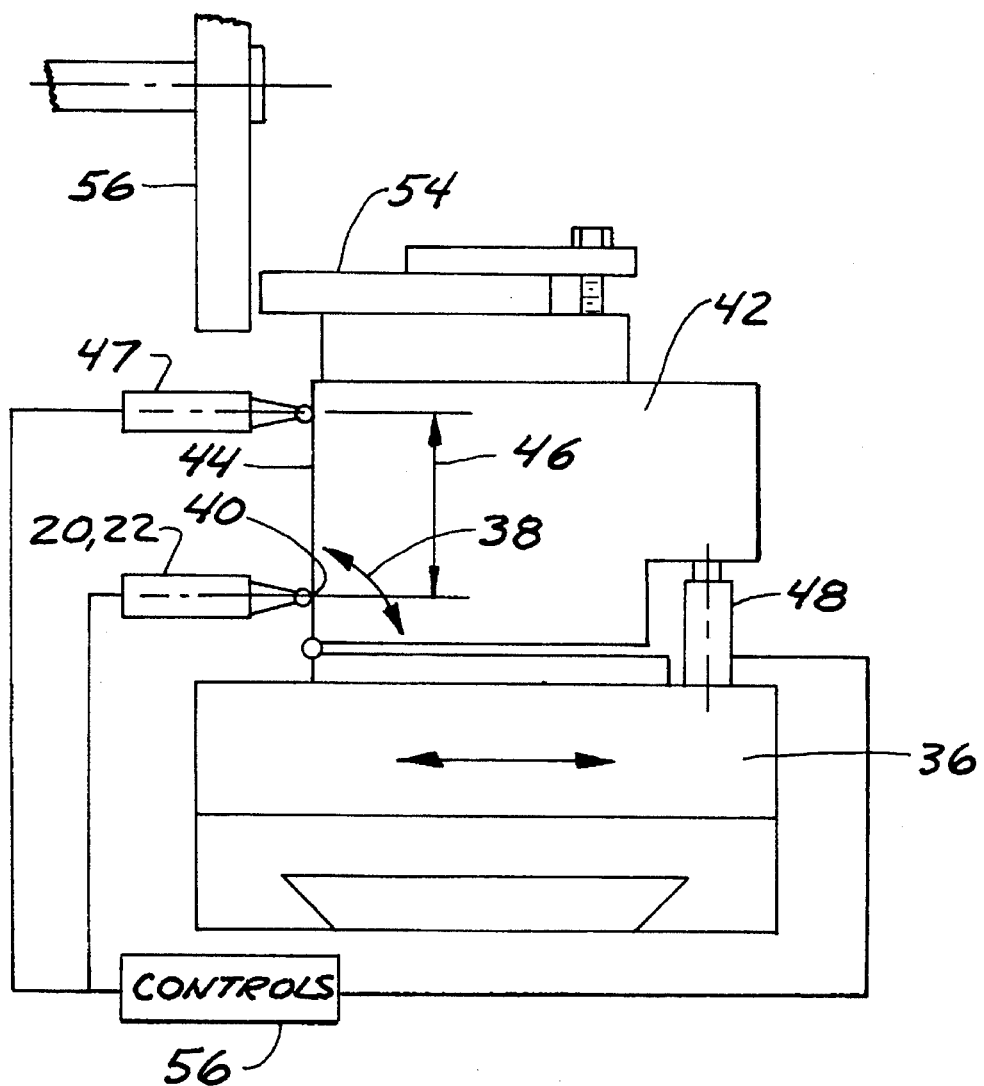
FIG. 3 is a schematic representation of the addition of the third sensor of the present invention for controlling a precise positioning of a plane for precision positioning of the tooling.

The schematic showing in FIG. 2 is one portion of the present invention, and in FIG. 3 it is illustrated that if the tooling table 36 tilts or tips as it moves along its guided path relative to a tool or if it tips when it is moved as indicated by the double arrow 38, the tilting would not be sensed if the tilting is pivoted about axis point 40. This will occur even though the two sensors would be operating along the line passing through axis 40 on the reference block 42 that has a reference surface 44. If the tilting occurs around any other axis, the sensors 20 and 22 will indicate only part of the error measurable on the axis 40, whereas the actual error on the part can be either greater or smaller than the error measured on axis 40.

A third sensor 47 of the present invention, which is spaced in a direction perpendicular to the axis between the first and second sensors 20, 22 by an amount indicated by double arrow 46, will sense this change, and by controlling the position of the reference surface and the piece part about an axis parallel to the line between the first two sensors with an actuator 48, operating through controls 50, the plane of cut by the machine tool is maintained straight by the first and second sensors, along an axis, the end of which is seen at 40, and will be controlled as to the tilt by the third sensor 47 and actuator 48. The workpiece 54 is ground by a grinding wheel shown schematically at 56. Workpiece 54 is securely and rigidly connected to the support block 42 that also carries the reference surface. The control of block 42 relative to the support 36 would be maintained precisely.

Referring to the preferred embodiments shown in FIGS. 4 through 8, the details of a machine tool will be shown only schematically. The machine tool includes a machine tool table 60 that is controllable in and out relative to a tool element such as a grinding wheel 66, as shown by the double arrow 62 through the use of actuator 70, well known controls 68 and sensors 20, 22 and 47, which sense this position of the table 60 relative to a grinding wheel 66 or other tool being used, and provide the data for setup positioning of the table 60.

Movement of the machine tool table 60 along the length of the workpiece is controlled by the controls and actuators for the machine tool table X-axis which are well known. As shown schematically in FIG. 5, a sensor 71 provides a position signal for the table to controls 72. The controls 72 control actuator 73 for moving the table along its length or in the X direction.

The device of the present invention includes a base assembly 76 comprising a mounting adapter 77 fixed to the table 60 in a suitable manner, and a first base plate 78 which is adjustably mounted on the adapter 77. The position of first plate 78 on adapter plate 77 is controlled by an adjustment screw 79 operating through a reaction block 80 fixed to adapter 77. The screw 79 is threaded into the first base plate 78. The first base plate 78 is used for mounting a second intermediate plate 82, which can be moved as will be explained in a reference plane generally parallel to the top of the table 60, and it can be moved not only by orthogonally sliding in the reference plane, but also by rotating about an axis perpendicular to the reference plane. The second intermediate plate 82 is supported on the first base plate 78 through the use of three flexures 83, 84, and 85 (See FIG. 5). The flexures provide a tripod support to resist relative vertical (up and down) movement between plates 78 and 82. The supports are very rigid in vertical direction.

Each of the flexures 83, 84, and 85 is constructed in the same manner. Referring to FIGS. 4 and 5 again, the flexures include central columns 83A, 84A, and 85A, respectively, which are cylindrical with a circular cross section. The flexures have square cross section enlarged ends 83B, 84B, and 85B, respectively. These enlarged ends 83B, 84B, and 85B are used for clamping the flexures in place in suitable receptacles. As shown, the table section 78 is provided with a "V" groove to receive one corner of the lower ends 83B, 84B, and 85B, and then the lower ends are clamped in place with suitable clamps 83C, 84C, and 85C, respectively.

The upper ends of the flexures are mounted along the edges of the intermediate plate 82, by providing "V" shaped receptacles in the edges of the intermediate plate 78, and clamps 83C, 84C, and 85C, respectively for holding the upper ends of the flexures in place.

The position of the second intermediate plate 82 relative to the first base plate 78 is controlled by the actuators 26 and 28 as previously explained. Actuator 26 is shown in FIG. 4, and has a base end that is attached with a suitable cap screw 87, to a support block 88 that is attached to the first base plate 78.

The actuator 28 (FIGS. 5 and 6) is connected through a support block 88 to the first base plate 78.

Figure 4:
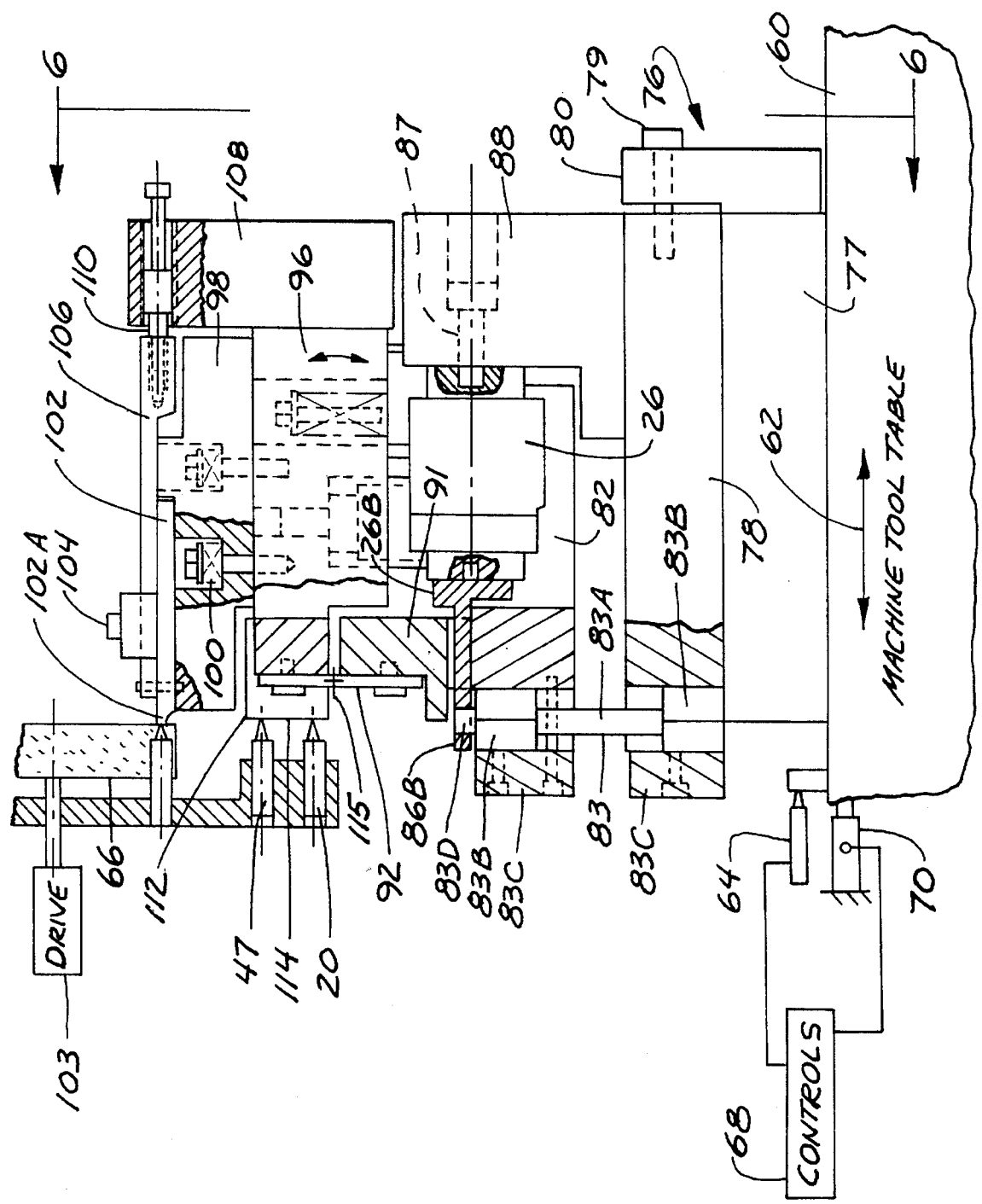
FIG. 4 is a side elevational view of the device made according to the present invention with parts broken away and parts in section.
Figure 5:
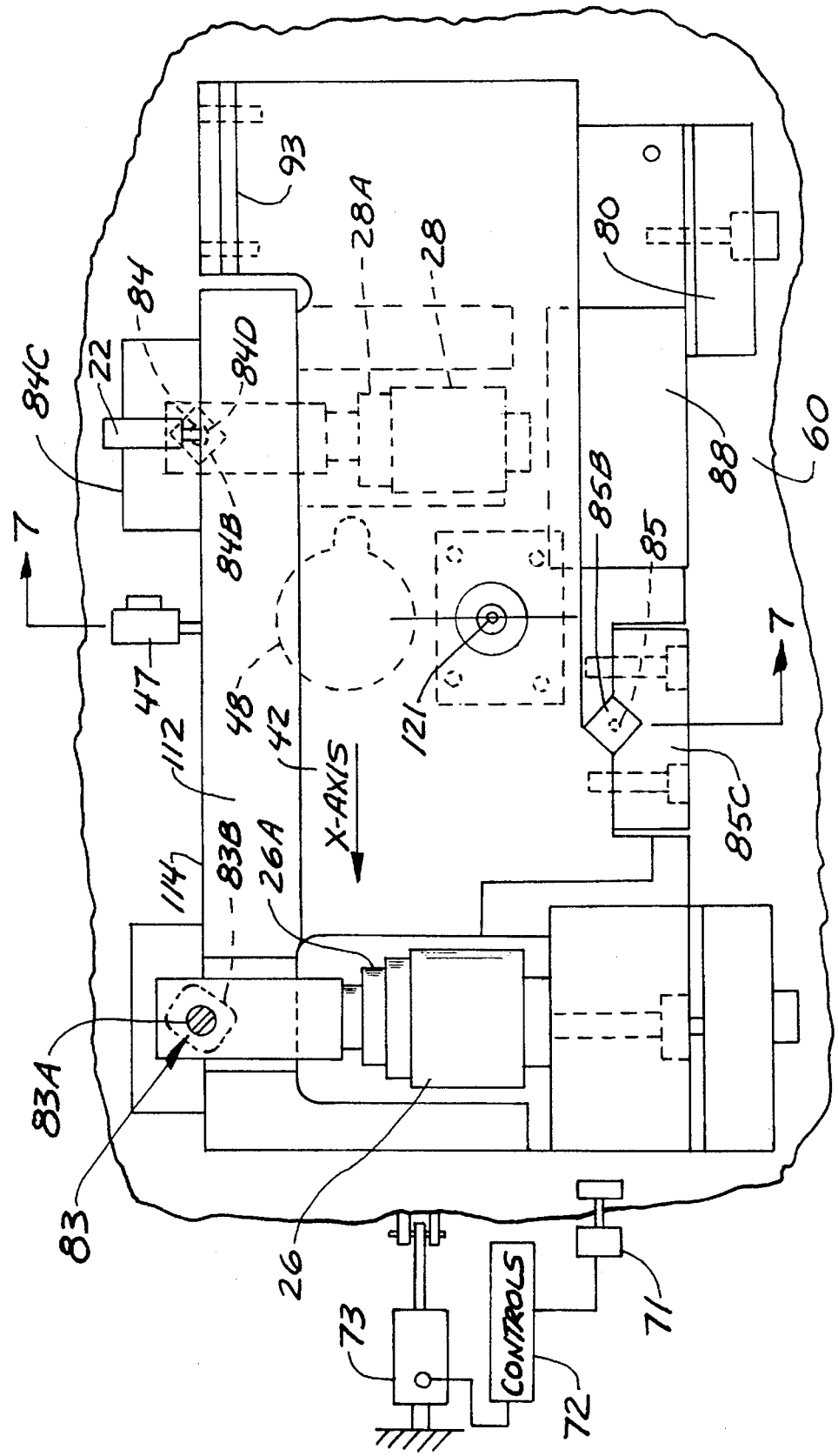
FIG. 5 is a top plan view of the device in FIG. 4 with parts broken away and parts in section.
Figure 6:
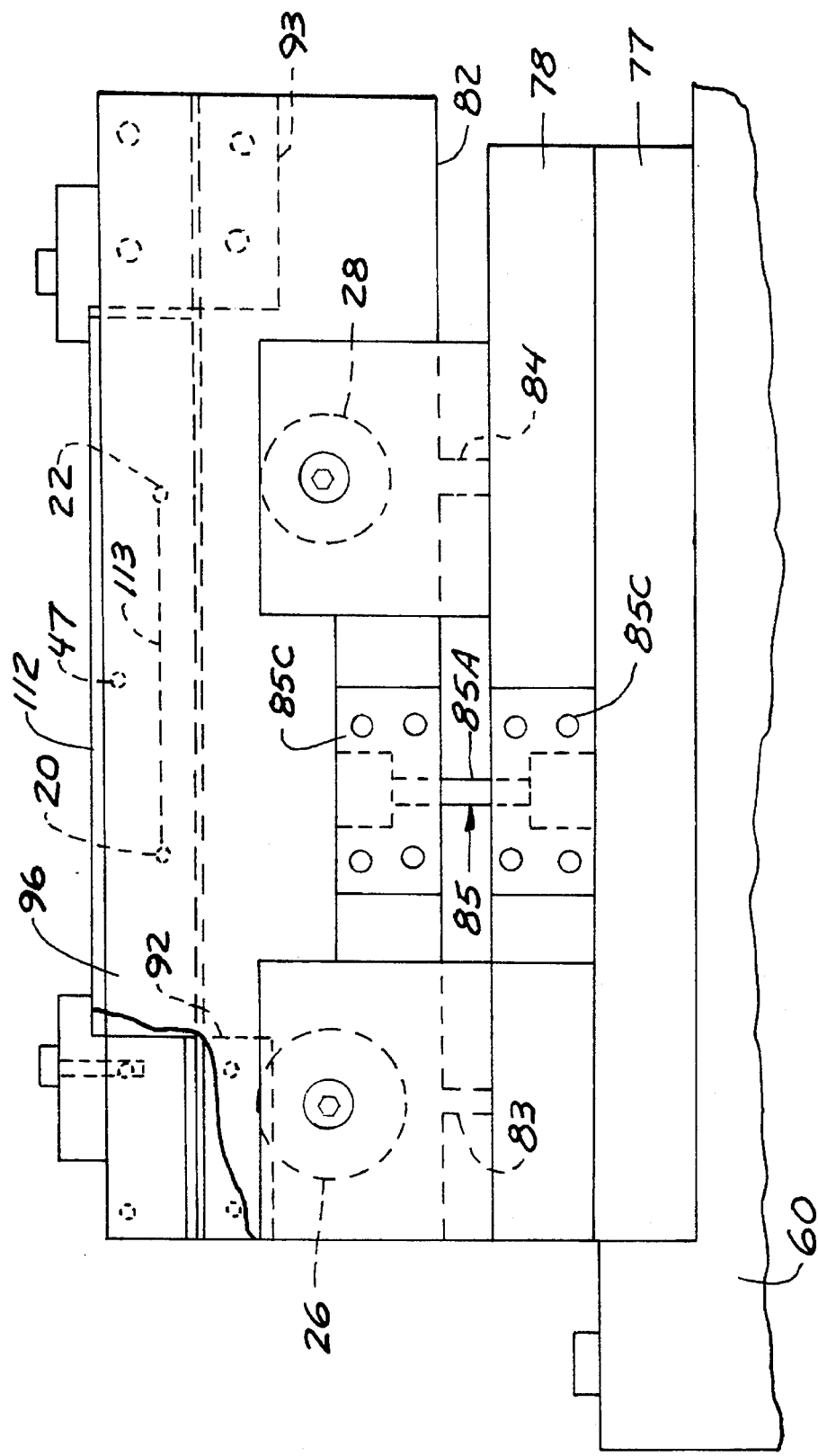
FIG. 6 is a front elevational view of the device of FIG. 4 generally along line 6—6 in FIG. 4.

The actuators 26 and 28 have extension elements 26A and 28A, that are connected to short stub shafts 83D and 84D, respectively, which are integral with and extend upwardly from the upper ends 83B and 84B of the flexures so that the movement of the actuators will provide a load in direction parallel to the table top, and in directions parallel to the double arrow 62 that is shown in FIG. 4.

Movement by the actuators 26 and 28 will cause shifting of the intermediate plate 82 parallel to the plate 78. Differential movement between the actuators 26 and 28, that is with one actuator extending more than the other, or combinations of one actuator retracting and the other extending, will cause the intermediate table 82 to rotate about an axis perpendicular to the plate 78 and to the machine tool table 60. The flexure 85 will twist when the table rotates, and all three flexures 83, 84, and 85 bend during orthogonal movement of the intermediate plate 82 parallel to the surface of the machine tool table 60. The intermediate plate 82 also can pivot about the connection to the stub shaft of one actuator if the other actuator extends or retracts.

The actuators 26 and 28 are preferably piezoelectric actuators that provide very precise positioning, are quite powerful and rigid, but have relatively short strokes.

The second intermediate plate 82 has support blocks 91 mounted thereon at suitable locations adjacent the edge of the second intermediate plate 82 close to the grinding wheel 66. The support blocks 91 are used for supporting flat strap bending flexures 92 and 93, respectively, which are attached to a surface of a support block 91 and which extend perpendicular to the plane of the machine tool table 60. The flexures 92 and 93 are thus perpendicular to the plane of shifting of the intermediate plate 82 when it is moved by the actuators 26 and 28. The opposite ends of the flexures 92 and 93 are connected to an edge surface of a third plate 96, comprising a workpiece positioning reference block 112. Plate 96 overlies the intermediate plate 82, and supports a tooling plate 98 on its upper surface. The tooling plate 98 is held in place on plate 96 through a suitable preloaded spring and cap screw arrangement indicated at 100 which preloads the tooling plate 98 against the top of plate 96. A workpiece to be ground indicated at 102 is mounted with suitable clamp brackets 104 to the tooling plate 98.

Adjustment of the position of workpiece 102 together with the tooling plate is obtained by moving one or both adjustment plates 106. Adjustment plates 106 are attached to each end of the tooling plate 98 with pins extending through the plates 106 with a slip fit and pressed in the tooling plate 98. This allows applying the adjusting movement to each side of the tooling plate independently. A bracket 108 is attached to the block 96. A separate differential adjusting screw 110 is threaded into the bracket 108 and into each of the adjustment plates 106. The difference in a lead of the threads permits very fine threaded adjustment toward and away from the bracket 108. The workpiece 102 has an edge surface 102A that is to be ground with the grinding wheel 66, and maintained in a straight, properly oriented plane, as will be described. The grinding wheel 66 can be driven with a drive 103 that is shown only schematically.

A reference bar 112 is rigidly mounted onto the reference block 96, and has a reference surface 114 that is machined to be precisely straight and flat. The reference bar 112 is held on the ground support surfaces of the reference block 96 so that the surface 114 is not distorted.

Sensors 20, 22, and 47 have sensing ends that ride on the surface 114. The sensors provide signals to indicate the position of the surface 114 and any deviation of the surface 114 from its initial position.

The flat strap flexures 92 and 93 are spaced apart in the longitudinal direction of the reference bar 112, and in direction of a reference line 113 (dotted line in FIG. 6) on the surface 114 between the sensors 20 and 22. The flat strap flexures prevent the reference block 96 and the holding plate 98, as well as the workpiece 102, from twisting, but permit the reference block 96 and the parts attached to it, including the reference bar 112, to move about an axis of pivoting that is parallel to the surface 114 and between the mounting block 91 and the reference block 96. This axis is indicated at 115 in FIGS. 4 and 7. The position of the reference block 96 about the axis 115 is controlled with the vertical actuator 48. The actuator 48 is also a piezoelectric actuator, which has its base attached to the intermediate plate 82, with a suitable cap screw 118. The actuator 48 has an actuator end 48A that is connected in a suitable manner to the reference block 96 as shown, and the movement of the actuator end 48A will cause pivoting of the reference block 96 about the axis 115 as guided by the flexures 92 and 93.

Figure 7:
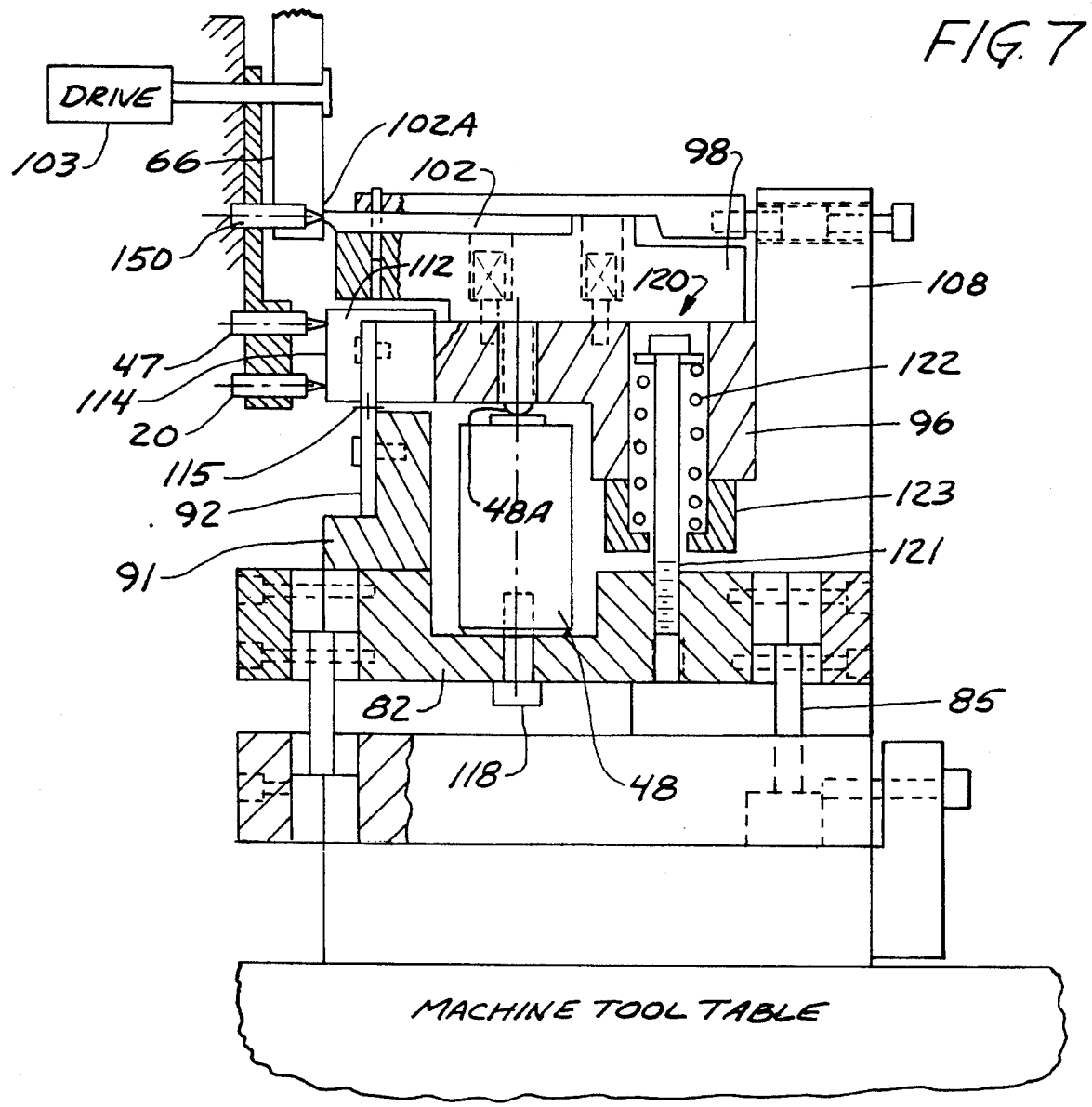
FIG. 7 is a sectional view with parts fragmentarily shown taken on line 7—7 in FIG. 5.

The reference block 96 is resiliently held from pivoting in a counter clockwise direction as seen in FIG. 7 through the use of a spring arrangement 120, which includes a cap screw 121 threaded into the intermediate plate 82, and which loads a spring 122 against a suitable shoulder of a cup 123 attached to reference block 96, to spring load the reference block 96 in a clockwise direction against the piezo actuator 48.

The position of the reference block 96 about the axis 115 will be sensed by the sensor 47, which is in closed loop control with the actuator 48. The actuator will maintain orientation of the surface 114 of the reference bar 112 at its initial orientation, to insure that the ground surface 102A is also maintained at the proper initial position relative to the sensor 47.

It can be seen that by utilizing the controls from the sensors 20 and 22, as well as the sensor 47, a precise positioning of the tooling plate 98 and the workpiece 102 held thereon will be maintained as the parts are moved by the machine tool table in a longitudinal direction of the sensor reference block 112. Deviation of the surface 114 from straight line movement will be sensed by the sensors 20 and 22, which establish line 113 along the surface 114. Any tilting of the workpiece 102 with its supports will be sensed by the sensor 47, which will restore the reference block 96 to its desired position by the closed loop control to the actuator 48.

It should be noted that in many instances when the workpiece that is being machined is not very high relative to the support surface, that is, its vertical height is not great, controls utilizing only the sensors 20 and 22 which establish a straight line may be adequate. However, for surface grinding of surfaces that have any appreciable vertical height, the additional sensor 47 provides precise control to insure that deviations from a plane are not present in the workpiece. The tilting axis 115 is located close to the reference surface 114, for ease of control.

The present invention can be incorporated on many different slides, or frames, by using the reference bar 112 with reference surface 114, and plates and actuators for a mounting assembly for parts to be machined or ground. The position sensors can be LVDT sensors of conventional construction, and as shown, have probes that are well known and will slide so that they have sliding contact with the reference surface 114. The sensors support is shown only schematically, and it has to provide mechanical and thermal stability for sensors as well as to accommodate a mechanical hardware for sensors positioning and adjustment.

As shown in FIG. 8, schematically, by the addition of two open loop sensors 150,152 that directly sense position of the ground surface on a workpiece 102, after grinding or machining a surface for each part, workpiece 102 is adjacent to the grinding wheel 66, which has a cutting edge 66A for grinding a plane on workpiece 102. Sensors 150 and 152 are mounted on the machine tool, and may be open loop LVDT sensors that provide position signals to the controls illustrated schematically at 154. The sensors 150 and 152 will engage the surface of a workpiece 102

Each time when, after installation of the next workpiece, the position control loop between the three sensors 20, 22 and 47 and the reference surface 114 is closed, the three piezo actuators will bring the reference surface and the next workpiece to the initial zero position. This positioning of the workpiece 102 is very precise and repetitive, considering very fine resolution of the sensors and piezo actuators available in the range of one microinch or less. This allows removing a precise amount of material from the workpiece if each following workpiece is positioned precisely relative to the grinding wheel.

To allow precise alignment of the workpiece relative to the grinding wheel 66, which apparently would be a selected depth of cut on the workpiece, there are two part positioning sensors 150, 152, or three in some instances, installed in the hardware attached to the spindle group so that these sensors can monitor the position of the workpiece when it is installed and adjusted in the present device.

When the first setup workpiece is positioned in the device and ground in a closed loop mode, it means that a workpiece is held in initial zero position relative to the grinding wheel during all of the machining cycle regardless of an actual error of the slide from the moment when the workpiece just started to approach the grinding wheel, to the moment when the machining is complete and the part moves beyond the grinding wheel.

As was mentioned before, as the result of such zero positioning, a straight and flat surface is produced on the workpiece, as a replication of the straight and flat reference surface. It is obvious that the plane where the cutting (grinding) edge of the wheel creates the surface on the workpiece and the ground surface on the work itself are on the same plane.

If after such grinding the ground workpiece is brought back to initial starting position in a closed loop mode, then the part positioning sensors 150, 152 will touch the straight and flat ground surface of the workpiece, which precisely coincides with the plane of the cutting edge of the grinding wheel. The part positioning sensors 150, 152 can be set to zero while they are touching the ground surface of the first ground workpiece held in close loop, locked zero position.

When a next workpiece is installed in the device, and the device is locked again in a closed loop zero position, the part positioning sensors 150, 152 touching the surface of the workpiece to be machined will show precisely where this surface is in regards to the cutting edge of the grinding wheel 66, because they will show how far before or beyond the sensor's zero the surface of the workpiece is placed.

Thus, if both sensors 150,152 show zero, then the workpiece is adjusted so that its surface to be machined lays precisely in a plane of the cutting edge of the grinding wheel. Obviously there will be no material removed from the part. Accordingly, there will be a layer of material removed from the part equal to the distance 156 that the workpiece is advanced forward beyond zero of each sensor.

If, for example, both sensors 150, 152 show equal values then this exact amount of the material will be removed from the workpiece from the beginning to the end of the workpiece. If the sensors show unequal values then an appropriate unequal amount of the material will be ground off when a straight ground surface is generated on the workpiece.

Each workpiece can be brought back to its initial starting position in a closed loop mode after grinding is complete. The part positioning sensors 150, 152, which have been set to zero while touching the ground surface of the previous workpiece in zero position, must show zero because all excess material protruding beyond zero position of the part positioning sensors is expected to be ground off. If these sensors 150, 152 do not show zero, it indicates that either the cutting edge of the wheel 66 has moved, for example due to wheel wear, or sensor drift, either thermal or electrical, is present. These both undesired deviations can be canceled for the next workpiece simply by resetting zero on both part positioning sensors 150, 152 while the sensors are touching the newly ground workpiece locked in zero position.

This important feature, verification of zero position of the group of workpiece positioning sensors against a precisely ground surface of the workpiece in a closed loop mode, improves precision even further because the verification provides data for continuous correction of the wheel wear and thermal or electrical drift in the control system. It also provides valuable information about the wheel wear and control system performance for further improvement of these vital components. Resetting the sensors 150, 152 to zero mechanically and/or electrically is within the skill of people working in the field or the resetting can be automated by adding appropriate control features to the machine.

It also should be noted that although the preferred embodiment is with the reference bar moving with the workpiece being controlled, the sensors can move with the workpiece and engage a stationary reference bar.

Although the present invention has been described with reference to preferred embodiments, workers skilled in the art will recognize that changes may be made in form and detail without departing from the spirit and scope of the invention.

What is claimed is:

1. Position control apparatus for a moving machining table comprising:

a first plate adapted to be supported in a desired position relative to a rotating machine tool;

a second plate spaced from said first plate, and flexure members coupling said second plate relative to said first plate for movement in a desired plane;

a pair of actuators coupled to the second plate and controlling movement in the plane, said actuators being spaced apart along a first line in said plane;

a reference surface mounted relative to said second plate such that movement of the second plate in the plane including the first line causes corresponding movement of the reference surface;

at least two sensors mounted for sensing movement of a second line on the reference surface in direction perpendicular to the reference surface; and control means coupled between said sensors and said actuators for maintaining the second line on the reference surface in a desired position under control of the actuators as the reference surface moves relative to the sensor.

2. The position control apparatus of claim 1 and a third plate mounted on a side of said second plate opposite from the first plate, said third plate mounted to said second plate about a pivot axis that is parallel to the first line, said reference surface being mounted to move with said third plate, a third actuator for controlling movement of said third plate about the pivot axis, and a third sensor spaced in direction perpendicular to the second line for engaging the reference surface to sense movements of the reference surface about the pivot axis, and control means responsive to the third sensor for controlling the third actuator to maintain the position of the third plate about the axis.

3. The position control apparatus of claim 1 and means to move the first plate in a direction parallel to the first line.

4. The position control apparatus of claim 1 and a support to mount a workpiece to be engaged by a rotating tool, at least one sensor for engaging a surface of a workpiece positioned adjacent the tool for sensing the position of such workpiece surface for determining the position of the workpiece surface relative to the rotating machine tool.

5. The position control apparatus of claim 2 and a power actuator for moving the machine tool table in direction along the first line.

6. The position control apparatus of claim 2, wherein said reference surface is on a bar, and said bar is mounted fixedly with respect to the third plate.

7. The position control apparatus of claim 2, and a mounting of the third plate for forming the pivot axis comprising a flat flexure member having opposite ends attached to the second and third plates, respectively, a plane of the flat flexure member being parallel to the first line.

8. The position control apparatus of claim 1, wherein said pair of actuators are mounted to control relative movement between the first plate and the second plate, said actuators having actuation axes that are generally parallel to each other and perpendicular to the first line, said actuators being spaced apart in direction along the first line.

9. The position control apparatus of claim 1, wherein said flexure members comprise a plurality of flexure elements having generally cylindrical cross sections between end portions thereof.

10. The position control apparatus of claim 9, wherein said flexure members have end portions which are of generally square cross sections for clamping to the respective plates.

11. The position control apparatus of claim 9, wherein said flexure elements comprise three flexure elements, a pair of such flexure elements being spaced apart in direction parallel to the first line, and being adjacent a side of the first and second plates adjacent to the reference surface, and a third flexure element spaced laterally from the first line and substantially midway between the pair of actuators in direction along the first line.

12. A position control apparatus for a movable machining table, wherein the table is part of a machine tool having a rotating working element for machining a workpiece, said table being movable in orthogonal directions, one direction being generally perpendicular to an axis of the rotating element, and the other direction being parallel to such axis, a mounting for a workpiece to be machined including;

a first plate mounted on the movable machining table for movement therewith;

a second plate spaced from said first plate, and flexure members coupling said second plate relative to said first plate for movement of the second plate in a plane generally parallel to the plane of movement of the machining table;

actuators for controlling movement of said second plate relative to said first plate in a plane generally parallel to a plane of movement of the machining table;

a planar surface formed on a reference member;

a pair of sensors for engagement with said planar surface and being spaced apart along a desired line on the planar surface, said sensors having means for slidably engaging the planar surface;

one of the reference members and sensors being mounted relative to the machine tool and the other of the reference member and sensors being mounted for movement with the second plate, the second plate being movable in direction transverse to the axis of the rotating element, and the sensors sliding along the desired line as the second plate moves transverse to the axis of the rotating working element; and a control circuit for controlling each actuator in a closed loop control from one of the respective sensors as the surface moves relative to the sensors, said actuators operating to maintain the position of the second plate as it moves in direction along the line to correct for deviation from straight line movement sensed by the sensors.

13. The position control apparatus of claim 12 and a third plate mounted on a side of said second plate opposite from the first plate, said third plate mounted to said second plate about a pivot axis that is parallel to the desired direction of movement of the second plate, said reference member being movable with said third plate, a third actuator for controlling movement of said third plate about the pivot axis, and a third sensor spaced in direction perpendicular to the desired line for engaging the planar surface of the reference member to sense movements of the planar surface about the pivot axis, and control means responsive to the third sensor for controlling the third actuator to maintain the position of the third plate about the pivot axis.

14. The position control apparatus of claim 13, wherein the reference member is positioned so that the desired line is parallel to the direction of movement of the second plate.

15. The position control apparatus of claim 12 and a workpiece mounted to move with the second member and to be engaged by the rotating element, a pair of position sensors for engaging a finished surface of a workpiece positioned adjacent the rotating element for sensing the position of such workpiece finished surface for determining the setting of the pair of position sensors relative to the finished surface and provide a zero setting signal.

16. The position control apparatus of claim 13, wherein said reference member is mounted fixedly with respect to the third plate.

17. The position control apparatus of claim 1, wherein said actuators comprise two actuators mounted to control relative movement between the first plate and the second plate, said two actuators each having actuation axes that are generally parallel to each other and spaced apart along and perpendicular to the direction of movement of the second plate, said actuators being spaced apart in direction along the first line.

* * * * *